United States Patent
Raaijmakers et al.

(10) Patent No.: US 12,515,543 B2
(45) Date of Patent: Jan. 6, 2026

(54) ELECTRIC VEHICLE CHARGING ARRANGEMENT AND RESPECTIVE METHOD

(71) Applicant: ABB E-MOBILITY B.V., Delft (NL)

(72) Inventors: Stefan Raaijmakers, WN Delft (NL); Miguel Rodriguez Escude, PB Delft (NL); Lars Peter Bech, JA Schiedam (NL); Mengxi Zhou, AD Rotterdam (NL)

(73) Assignee: ABB E-MOBILITY B.V., Delft (NL)

( * ) Notice: Subject to any disclaimer, the term of this patent is extended or adjusted under 35 U.S.C. 154(b) by 679 days.

(21) Appl. No.: 17/870,057

(22) Filed: Jul. 21, 2022

(65) Prior Publication Data
US 2023/0024483 A1    Jan. 26, 2023

(30) Foreign Application Priority Data
Jul. 21, 2021    (EP) .................................... 21187014

(51) Int. Cl.
*B60L 53/14*    (2019.01)
*H02J 7/04*    (2006.01)
(Continued)

(52) U.S. Cl.
CPC ............... *B60L 53/14* (2019.02); *H02J 7/04* (2013.01); *H02J 7/345* (2013.01); *H02M 1/36* (2013.01);
(Continued)

(58) Field of Classification Search
CPC ........ B60L 53/14; B60L 2210/30; H02J 7/04; H02J 7/345; H02J 2207/20; H02M 1/36
(Continued)

(56) References Cited

U.S. PATENT DOCUMENTS

| | | | |
|---|---|---|---|
| 10,773,601 B2 | 9/2020 | Curuvija et al. | |
| 2013/0234675 A1* | 9/2013 | King ........................ | H02J 7/04 320/163 |

(Continued)

FOREIGN PATENT DOCUMENTS

| | | |
|---|---|---|
| EP | 3815958 A1 | 5/2021 |
| WO | 2011145939 A2 | 11/2011 |

(Continued)

OTHER PUBLICATIONS

Extended European Search Report for European Application No. 21187014.2, dated Jan. 18, 2022, 8 pages.

*Primary Examiner* — Edward Tso
*Assistant Examiner* — Aaron Piggush
(74) *Attorney, Agent, or Firm* — McCarter & English, LLP; Michael M. Gnibus

(57) ABSTRACT

Described herein is an electric vehicle charging arrangement for charging an electric vehicle, including an electric vehicle supply equipment (EVSE), where the EVSE includes: a power module configured to provide electrical energy to charge the electric vehicle, an output configured to connect the power module to the electric vehicle for charging the electric vehicle, and a direct current (DC) bus provided between and connected to the power module and the output and configured to transport electric energy from the power module to the output, where the electric vehicle supply equipment includes a pre-charge module configured to pre-charge the output, and where the pre-charge module is separate from the power module and electrically connected to the DC bus.

15 Claims, 7 Drawing Sheets

(51) Int. Cl.
*H02J 7/34* (2006.01)
*H02M 1/36* (2007.01)

(52) U.S. Cl.
CPC ....... *B60L 2210/30* (2013.01); *H02J 2207/20* (2020.01)

(58) Field of Classification Search
USPC ................................ 320/104, 107, 109, 137
See application file for complete search history.

(56) References Cited

U.S. PATENT DOCUMENTS

| | | | |
|---|---|---|---|
| 2019/0036462 A1* | 1/2019 | Tazaki | H02M 1/32 |
| 2020/0139839 A1* | 5/2020 | Raaijmakers | B60L 53/62 |
| 2020/0274375 A1* | 8/2020 | Griffiths | H02J 7/24 |

FOREIGN PATENT DOCUMENTS

| | | |
|---|---|---|
| WO | 2011145939 A3 | 11/2011 |
| WO | 2011145939 A9 | 11/2011 |
| WO | 2014000649 A1 | 1/2014 |
| WO | 2014206366 A1 | 12/2014 |
| WO | 2019011905 A2 | 1/2019 |
| WO | 2019011905 A3 | 1/2019 |

* cited by examiner

ELECTRIC VEHICLE CHARGING ARRANGEMENT AND RESPECTIVE METHOD

CROSS-REFERENCE TO RELATED APPLICATION

This application claims priority to European Patent Application No. 21187014.2, filed Jul. 21, 2021, and titled "ELECTRIC VEHICLE CHARGING ARRANGEMENT AND RESPECTIVE METHOD", which is hereby incorporated by reference in its entirety.

BACKGROUND

The present disclosure relates to an electric vehicle charging arrangement. Furthermore, the present disclosure relates to a method for charging an electric vehicle by means of an electric vehicle charging arrangement.

Such an electric vehicle charging arrangement is known from the prior art. The known electric vehicle charging arrangement includes an electric vehicle supply equipment, EVSE, with a power module having an input for receiving electric energy from a power input connected to an alternating current, AC, grid and converts the received AC into a direct current, DC, to charge an electric vehicle. The EVSE further includes an output with a connector for connecting to the electric vehicle to be charged, which output is electrically connected to the power module via a DC bus with a DC+ conductor and a DC− conductor. The DC+ conductor is provided with a contactor and the DC− conductor is provided with a contactor, wherein both contactors are configured for selectively connecting or disconnecting the power module and the output. The EVSE further includes a pre-charge circuit having a resistor and a relay in parallel to the contactor of the DC+ conductor.

During charging of an electric vehicle, there are stages during which a voltage without any or very low current delivery is put on the DC bus. These stages include a cable check and a pre-charge. The cable check involves measuring an insulation between the DC+ conductor and a protective earthing, PE, and between the DC− conductor and the PE. Y capacitances present within the power module, the DC bus and the output, effectuate the time needed for performing the cable check, since the cable check relies on the measurement of an AC signal and measures the amplitude and phase shift caused by impedance on the DC bus. The higher the Y capacitance of the power module, the DC bus and the output, the longer the cable check disadvantageously takes. Furthermore, the higher the Y capacitance, the higher the amount of electrical energy stored in the Y capacitance in case of a failure.

During pre-charge, the vehicle battery of the electric vehicle is not connected to the DC bus yet. Pre-charging involves charging the voltage at the output near to the battery voltage of the vehicle battery, with a ±20V tolerance, and charging the internal capacitors at the output to prevent a high inrush current when the vehicle battery is connected to the DC bus. Pre-charging is usually done with the pre-charge circuit having the resistor and relay in parallel to the DC+ contactor, in combination with the power module. A disadvantage is that if there are imbalances in the resistors and the capacitors at the output and the input of the electric vehicle, there might be a very high uncontrolled inrush current when the vehicle battery is connected to the DC bus.

A further disadvantage of the known electric vehicle charging arrangement may be that due to only a resistor in the DC+ path and imbalances in the Y capacitors in the electric vehicle, there may be a high inrush current through the DC− path.

BRIEF DESCRIPTION

Embodiments of the present disclosure provide an electric vehicle charging arrangement and a method for charging an electric vehicle, in which high inrush currents are prevented from occurring.

According to a first aspect, the present disclosure provides an electric vehicle charging arrangement for charging an electric vehicle, including an electric vehicle supply equipment, EVSE, wherein the EVSE includes:

a power module configured for providing electrical energy to charge the electric vehicle, an output configured for connecting the power module to the electric vehicle for charging the electric vehicle, and a direct current, DC, bus provided between and connected to the power module and the output and configured for transporting electric energy from the power module to the output, wherein the electric vehicle supply equipment includes a pre-charge module configured for pre-charging the output, wherein the pre-charge module is separated from the power module and electrically connected to the DC bus.

The electric vehicle supply equipment according to the present disclosure thus includes the pre-charge module that is separated from the power module. Therefore, the pre-charge module is an independent pre-charge module as it works independently from the power module, such that the pre-charge module is used for pre-charging and the power module is used for charging the electric vehicle. Pre-charging involves putting a voltage onto the DC but without any or very low current delivery, such that the pre-charge module has to output no or very little current. In contrast, the power module has to able to output a very high current, such as or more than 500 A, 600 A or 3000 A. As the pre-charging module only has to output no or very little current, the Y capacitance of the pre-charge module may be kept to a minimum and/or the output impedance of the pre-charge module may be high. Due to having a minimal Y capacitance and/or a high output impedance no or very little electrical energy is collected and stored at the pre-charge module, while no or very little current is output to the DC bus. This advantageously results in that high inrush currents are reduced or in the ideal case prevented, when the vehicle battery is connected to the DC bus after pre-charging.

Furthermore, due to the minimal Y capacitance of the pre-charge module, a cable check may be performed within a shorter time period when compared to the prior art. Additionally, in case of a failure, less energy is stored in the Y capacitors of the pre-charge module, which may result in improved safety for users.

In the context of the present disclosure, the output may be understood to include a charging cable and a charging connector, a pantograph and/or an automatic connection system for connecting an electric vehicle to the EVSE.

Furthermore, in the context of the present application, an electric vehicle supply equipment (EVSE) may be referred to as electric vehicle charger, electric vehicle, EV, charging station, electric recharging point, charging point, charge point, charge post or electronic charging station (ECS). The electric vehicle charger is an element in an infrastructure that supplies electric energy for recharging of electric vehicles, including electric cars, neighborhood electric vehicles, electric busses and plug-in hybrids, for example via a charging cable and a charging connector, via a pantograph and/or via an automatic connection system to the EV. Electric vehicle chargers usually comply with standards for electric vehicle fast charging, such as the so-called Combined Charging System (CCS) protocol according to IEC 61851-23 and SAE J1772 standard for charging electric vehicles both in the US and in the European Union, EU. The Combined Charging System (CCS) protocol is a fast charging method for charging electric vehicles delivering high-voltage direct current via a charging connector derived from SAE J1772 standard (IEC Type 1) or IEC Type 2 connector. The proposed electric vehicle charging arrangement may be advantageously used with even higher charging currents such as or more than 500 A, 600 A or 3000 A, voltages such as or higher 1000V, 1500V or 3000V and/or in combination with newer standards not yet defined requiring higher currents.

In an embodiment, the DC bus includes a DC+ conductor and a DC− conductor, wherein the pre-charge module is connected to the DC+ conductor and the DC− conductor. Since the pre-charging module is connected to both the DC+ conductor and the DC− conductor of the DC bus, the pre-charge module may be used for pre-charging the DC+ conductor and the DC− conductor. As a result, inrush currents when the vehicle battery is connected to the DC bus after pre-charging, are reduced or in the ideal case eliminated on both the DC+ and DC− conductors.

In an embodiment, the DC bus includes a contactor between the power module and the output, which contactor is configured for connecting or disconnecting the power module and the output. In an embodiment, the pre-charge module is connected to the DC bus downstream of the contactor. In an even further embodiment, a pre-charge switching matrix is provided between the pre-charge module and the DC bus and configured for selectively disconnecting or connecting the pre-charge module and the DC bus downstream of the contactor. According to this embodiment, the pre-charge module may be disconnected from the DC bus, such that the pre-charge module is prevented from being involved with actual charging of an electrical vehicle.

In an embodiment, the pre-charge module is connected to the DC bus upstream of the contactor. According to this embodiment, the pre-charge module is also connected to the DC bus downstream of the contactor. During use of the EVSE, contact welding in the contactors may occur during closing of contacts within the contactors or during opening and immediate reclosing of contacts within the contactors, for example, because of inrush currents exceeding the making capacity of the contactors. According to this embodiment, the pre-charge module is enabled to perform welding detection of the contactors, if any, and/or to measure the voltage at the DC bus at the power module side of the contactors.

In an embodiment, a measure switching matrix is provided between the pre-charge module and the DC bus and configured for selectively disconnecting or connecting the pre-charge module and the DC bus upstream of the contactor In an embodiment, the EVSE includes one or more further outputs, and one or more further DC busses for connecting the one or more further outputs to the DC bus and/or the power module, and wherein the pre-charge module is electrically connected to the one or more further DC busses, and/or wherein the EVSE includes further pre-charge modules for each of the one or more further outputs. According to this embodiment, the EVSE has a single pre-charge module with a single power module and multiple outputs, or has a single power module, multiple outputs and a pre-charge module for each output. According to this embodiment, the EVSE is enabled to use the power module for charging an electric vehicle connected to the output, and to perform simultaneously pre-charge and/or cable check in a further output. If supported by the electric vehicle connected to the further output, the EVSE may charge at 0 amps (A) at the further output or pause in order to keep both charging sessions running. When the charging session at the output is finished, the power module may switch to the further output to start charging the electric vehicle connected to the further output. An advantage of this embodiment, therefore, is that it allows for sequential charging of multiple electric vehicles.

Alternatively, the EVSE includes one or more further power modules, one or more further outputs for connecting the one or more further power modules to one or more electric vehicles, and one or more further DC busses provided between and connected to the one or more further power modules and the one or more further outputs, and wherein the pre-charge module is electrically connected to the one or more further DC busses, and/or wherein the EVSE includes further pre-charge modules for each of the one or more further outputs.

In an embodiment, the EVSE includes a controller operatively connected to the pre-charge module and configured for controlling the pre-charge module. In an embodiment thereof, the controller is configured for powering the pre-charge module with alternating current, AC, or direct current, DC. According to this embodiment, the pre-charge module is powered by the controller, such that the power module is not required for powering the pre-charge module. Additionally, the controller may receive information from the electric vehicle to be charged, for example, about the battery voltage of the vehicle battery, therewith enabling the controller to control the pre-charge module on basis of the received information.

In an embodiment, the pre-charge module is integrated in a printed circuit board, PCB. For example, the PCB may be used for controlling the charge session(s) performed by the EVSE. When the pre-charge module is embedded in the PCB, which may include embedding the pre-charge module in the PCB without any switching matrices, the pre-charge module advantageously may be cheap and safe.

In an embodiment, the pre-charge module has a high output impedance and/or a low Y capacitance. The pre-charge module having a high output impedance has to be understood as that the pre-charge module outputs no or very little power to the DC bus. Low capacitance has to be understood as that the ability of the pre-charge module to collect and store energy in the form of an electrical charge is very low. According to a second aspect, the present disclosure provides a method for charging an electric vehicle by means of an electric vehicle charging arrangement according to the first aspect of the present disclosure, wherein the method includes the steps of:

connecting an electric vehicle to be charged to the output of the electric vehicle supply equipment, without connecting a vehicle battery of the electric vehicle to the DC bus;

pre-charging the output to a voltage near to or corresponding to a battery voltage of the vehicle battery by means of the pre-charge module;

when the output is pre-charged, connecting the vehicle battery to the DC bus; and charging the electric vehicle.

The method according to the present disclosure has at least the same technical advantages as described in relation to the first aspect of the present disclosure.

In an embodiment, the EVSE includes one or more further outputs, and one or more further DC busses for connecting the one or more further outputs to the DC bus, and wherein the pre-charge module is electrically connected to the one or more further DC busses, and/or wherein the EVSE includes one or more further pre-charge modules for each of the one or more further outputs, wherein the method includes the steps of:

connecting another electric vehicle to be charged to one of the one or more further outputs of the electric vehicle supply equipment, without connecting a vehicle battery of the respective electric vehicle to the further DC bus;

while charging the electric vehicle connected to the output, pre-charging the one of the one or more further outputs;

when the one of the one or more further outputs is pre-charged, charging at the one of the one or more further outputs at 0 A, or pausing; and when the electric vehicle connected to the output is charged, starting to charge the other electric vehicle connected to the one of the one or more further outputs.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The present disclosure will be elucidated on the basis of an exemplary embodiment shown in the attached drawings.

DETAILED DESCRIPTION

Figure 1:
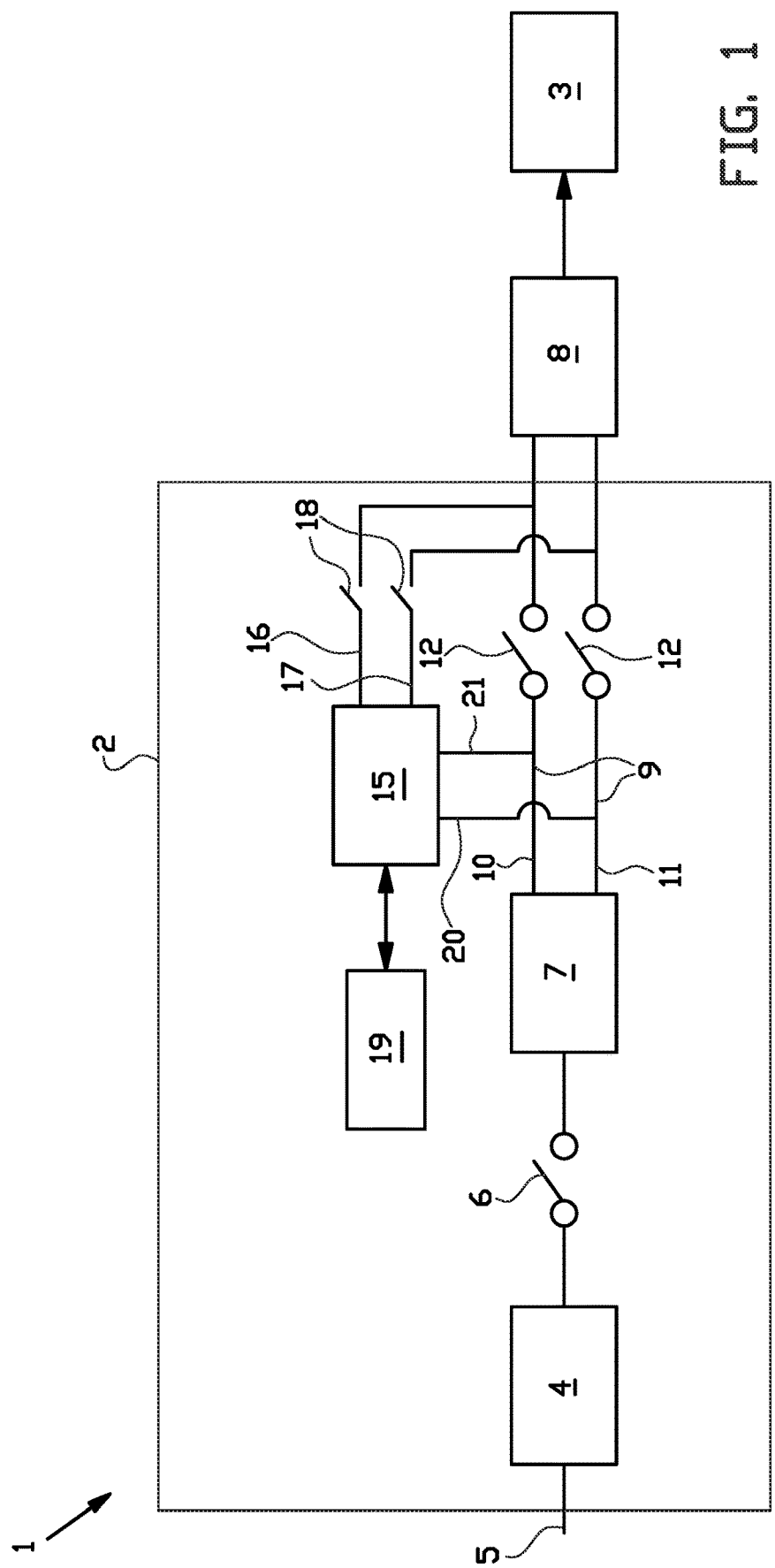
FIG. 1 shows a schematic view of an electric vehicle charging arrangement according to an embodiment of the present disclosure.

A schematic view of an electric vehicle charging arrangement 1 according to an embodiment of the present disclosure is shown in FIG. 1. The electric vehicle charging arrangement 1 includes an electric vehicle supply equipment, EVSE, 2 for supplying electric energy to an electric vehicle 3 to charge the electric vehicle 3. The EVSE 2 includes, optionally, an isolation transformer 4 configured for receiving power, for example, from an alternating current, AC, grid via a power input 5 and for protecting the electric vehicle 3 connected to the EVSE from any short circuit event that, for example, may occur on another electric vehicle or on the grid. Downstream of the isolation transformer 3 is provided a disconnection device 6 configured for connecting the isolation transformer 4 to or for disconnecting the isolation transformer 4 from a power module 7 arranged downstream of the disconnection device 6. The power module 7 is configured for converting an alternating current, AC, to a direct current, DC, and may include a linked set of power modules. The power module 7 outputs the DC to an output 8 arranged downstream of the power module via a DC bus 9 having a DC+ conductor 10 and a DC− conductor 11. The output 8 is configured for connection to the electric vehicle 3 to be charged. Each of the DC+ conductor 10 and the DC− conductor 11 is provided with a contactor 12 arranged between the power module 7 and the output 8. The contactors 12 are configured for connecting or disconnecting the power module 7 and the output 8.

The EVSE 2 according to this embodiment of the present disclosure is further provided with a pre-charge module 15 that is independent or separate from the power module 7. The pre-charge module 15, in particular the output thereof, is connected to the DC+ conductor 10 by means of a DC+ pre-charge conductor 16, and to the DC− conductor 11 by means of a DC− pre-charge conductor 17 downstream of the contactors 12. The DC+ pre-charge conductor 16 and the DC− pre-charge conductor 17 are provided with a pre-charge switching matrix 18 for selectively connecting or disconnecting the pre-charge module 15 with the DC bus 9. Furthermore, a controller 19 is provided within the EVSE 2, which controller 19 is operatively connected to the pre-charge module 15. The controller 19 is configured for controlling the pre-charge module 15, for example, on basis of an indication of a battery voltage of the electric vehicle 3 to be charged, such that the pre-charge module 15 may charge the voltage at the output 8 to substantially correspond to the battery voltage. Additionally, the controller 19 is configured for providing a DC control power to the pre-charge module 15 to power the pre-charge module 15. The pre-charge module 15, therefore, is intended to operate independently from the power module 7, such that electric components of the power module 7 do not play a role during a pre-charging phase of the EVSE 2. It is noted that the Y capacitance of the pre-charge module 15 is kept to a minimum to reduce or in the ideal case eliminate current inrush in both contactors 15 in the DC+ conductor 10 and the DC− conductor 11. For example, the pre-charge module 15 may include a DC/DC converter, such as a 1:1 DC/DC convertor, and/or a fly-back convertor that would be sufficient and cost-effective.

Optionally, the pre-charge module 15 may be used for performing a cable check, in which the insulation resistance between the DC+ conductor 10 and the not shown protective earthing, PE, and between the DC− conductor and the PE is measured.

During the pre-charging phase of the EVSE, the battery of the electric vehicle 3 to be charged is disconnected from the DC bus 9 by a not shown disconnection device within the electric vehicle 3. The controller 19 controls the pre-charge module 15 to charge the EVSE 2 to reach a voltage near to or corresponding to the battery voltage of the battery of the electric vehicle 3, for example with a tolerance of ±20V, and to charge the internal capacitors at the output 8. Therewith, a high inrush current is reduced or in the ideal case prevented when the electric vehicle 3 closes its disconnection device to connect its battery to the DC bus 9.

As shown in FIG. 1, the pre-charge module 15 is also connected to the DC bus 9 upstream of the contactors 12 by means of a DC− measure conductor 20 and a DC+measure conductor 21. The pre-charge module 15, therewith, is enabled to perform welding detection of the contactors 12, and/or to measure the voltage on the power module side of the contactors 12.

The pre-charge module 15 is enabled to output the maximum voltage of the EVSE 2, for example 1000V DC, and sufficient current, for example 250 mA, to charge the capacitors between the power module 7 and the output 8. The pre-charge module 15, optionally, may be integrated in a printed circuit board, PCB, used for controlling charging sessions with the EVSE 2

Figure 2:
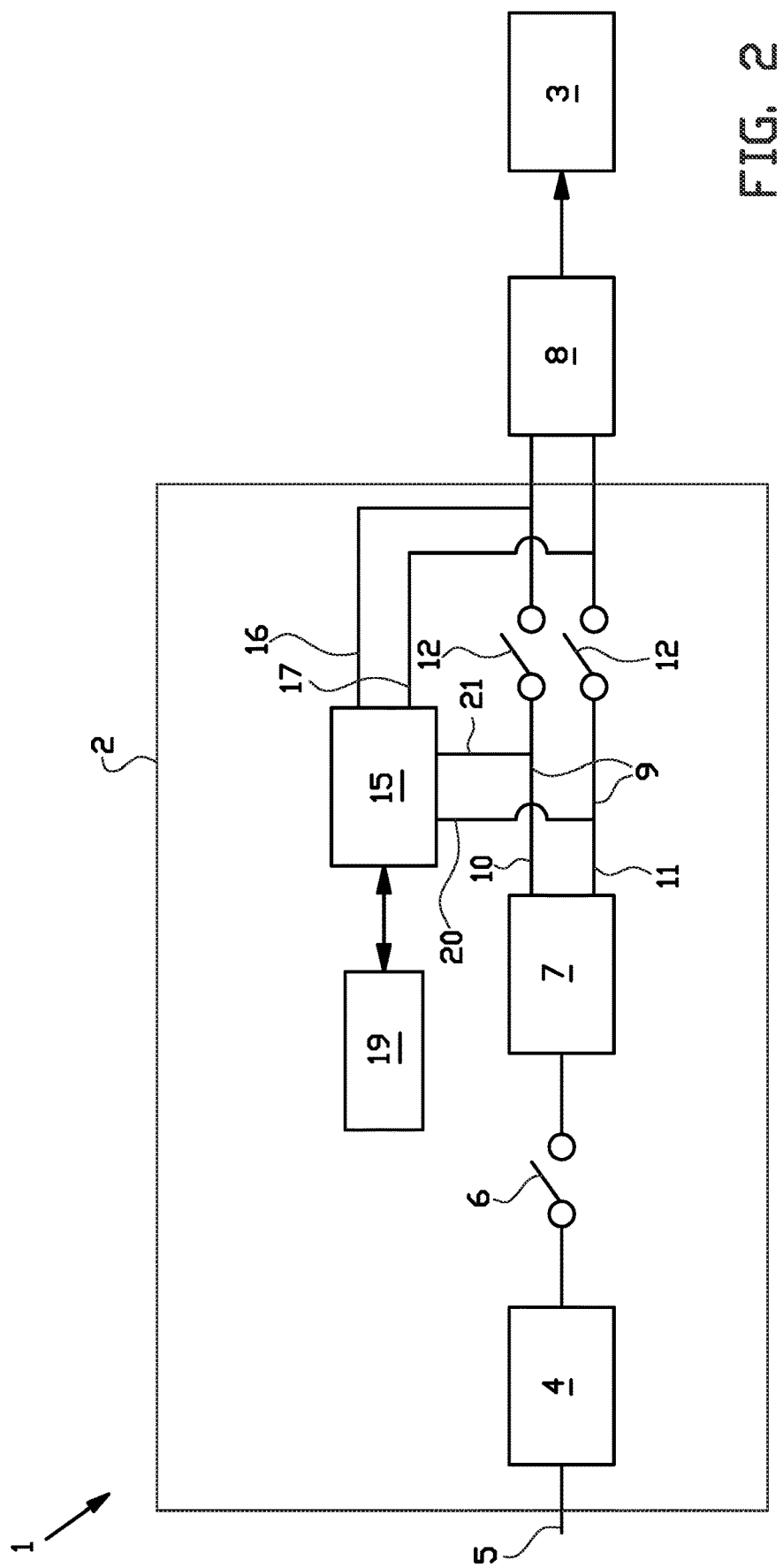
FIG. 2 shows a schematic view of an electric vehicle charging arrangement according to an alternative embodiment of the present disclosure.

A schematic view of an electric vehicle charging arrangement 1 according to an alternative embodiment of the present disclosure is shown in FIG. 2. In order to refrain from re-introducing corresponding or similar features, corresponding or similar features are referred to by the same reference numbers as used in relation to FIG. 1.

The alternative embodiment as shown in FIG. 2 differs from the embodiment shown in FIG. 1 in that the pre-charge module 15 is permanently connected to the DC bus 9 by means of the DC+ pre-charge conductor 16 and the DC− pre-charge conductor 17, such that use of a pre-charge switching matrix 18 is avoided.

Figure 3:
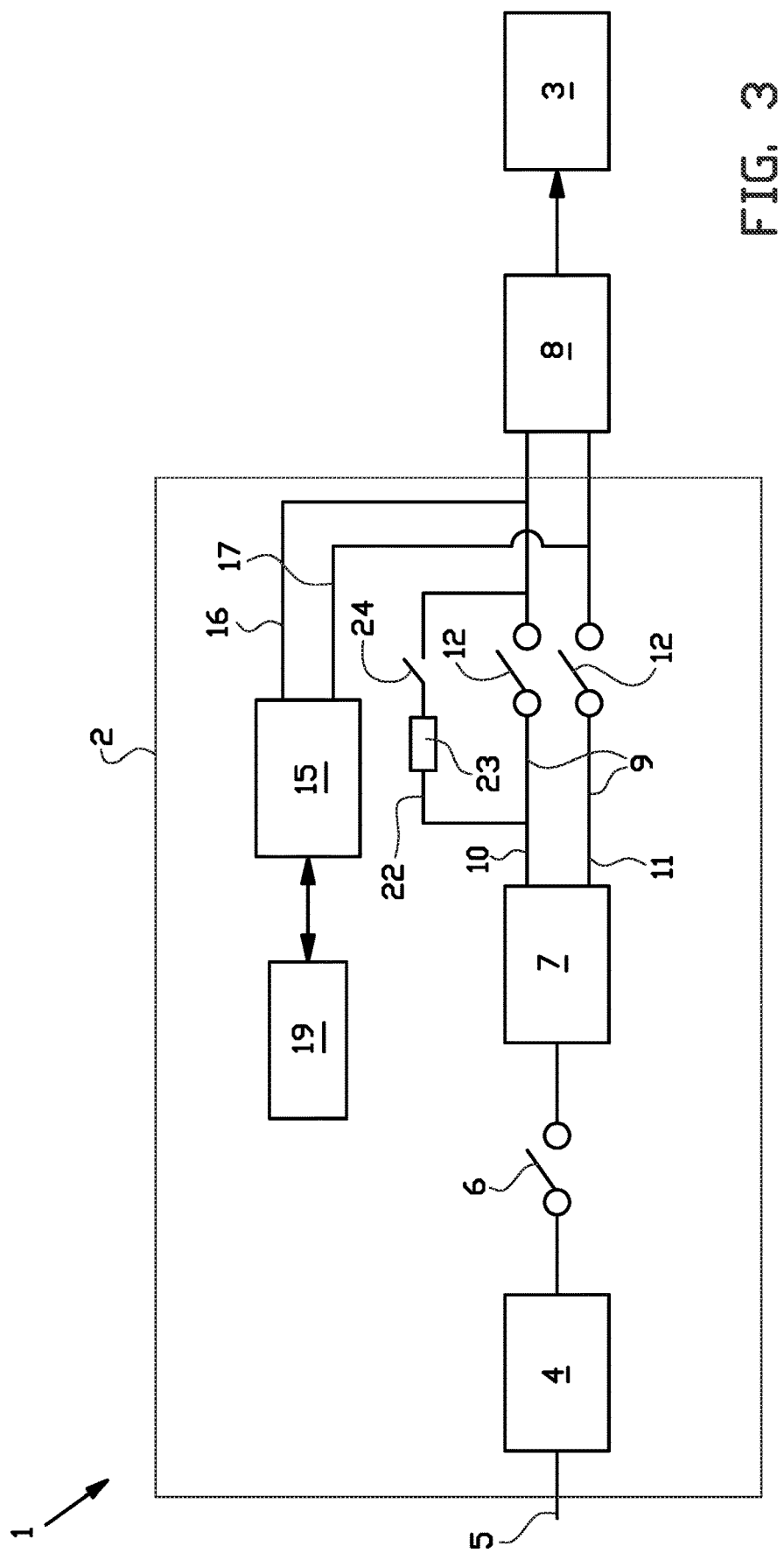
FIG. 3 shows a schematic view of an electric vehicle charging arrangement according to a further embodiment of the present disclosure.

A schematic view of an electric vehicle charging arrangement 1 according to a further embodiment of the present disclosure is shown in FIG. 3. In order to refrain from re-introducing corresponding or similar features, corresponding or similar features are referred to by the same reference numbers as used in relation to FIG. 1 and FIG. 2.

The further embodiment as shown in FIG. 3 differs from the embodiment shown in FIG. 2 in that the EVSE 2 includes a conventional pre-charge circuit 22 having a pre-charge resistor 23 and a pre-charge relay 24, which pre-charge circuit 22 is arranged in parallel to the contactor 12 in the DC+ conductor 10. According to this embodiment, the pre-charge module 15 may be added retrospectively to an existing EVSE 2 within the need for removing the conventional pre-charge circuit 22. After adding the pre-charge module 15 according to the present disclosure, the conventional pre-charge circuit 22 will no longer be used.

Furthermore, as shown in FIG. 3, the pre-charge module 15 lacks the DC− measure conductor 20 and the DC+ measure conductor 21, such that the pre-charge module 15 is not connected to the DC bus 9 at a position upstream of the contactors 12.

Figure 4:
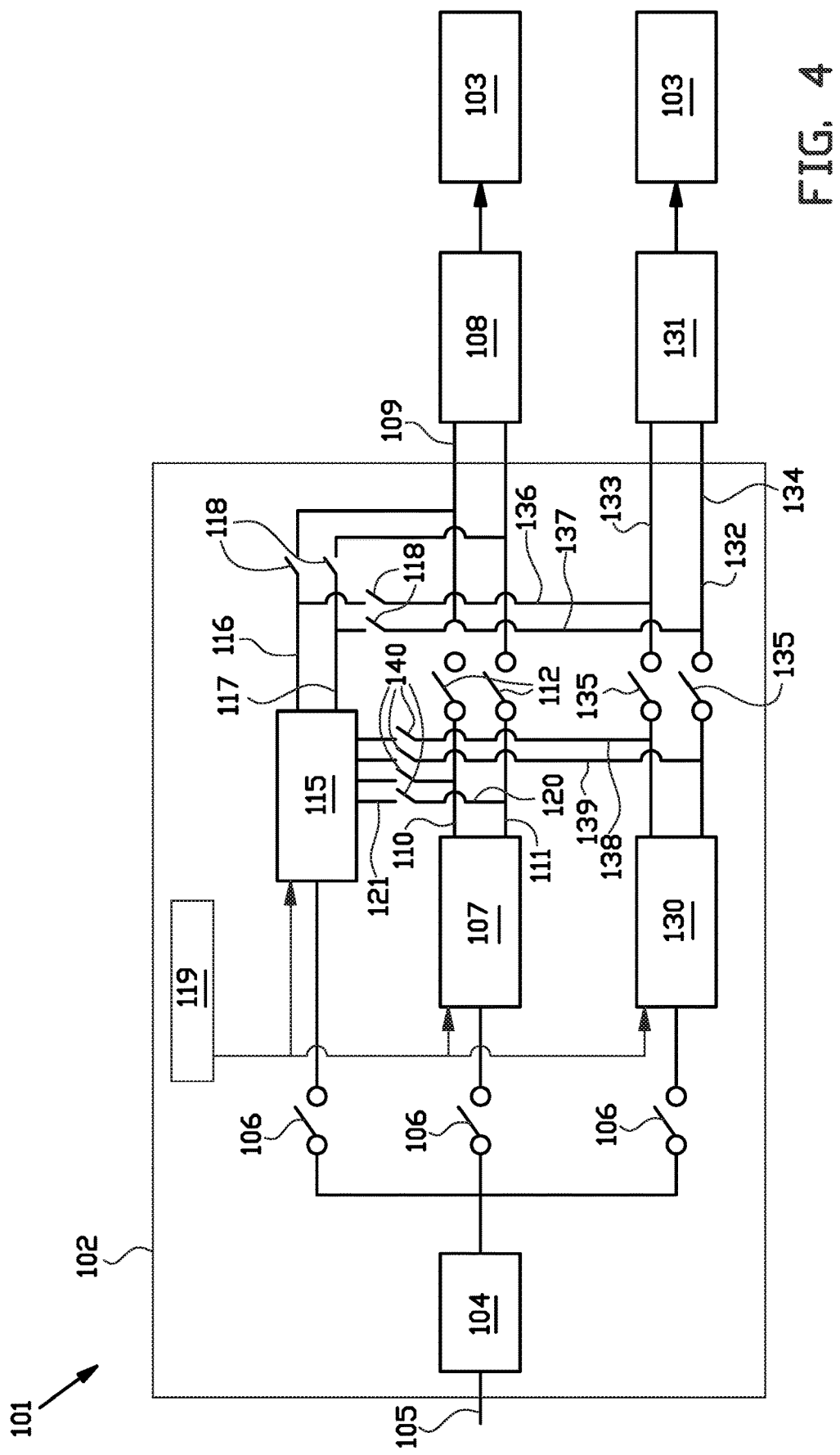
FIG. 4 shows a schematic view of an electric vehicle charging arrangement according to a further embodiment of the present disclosure.
Figure 5:
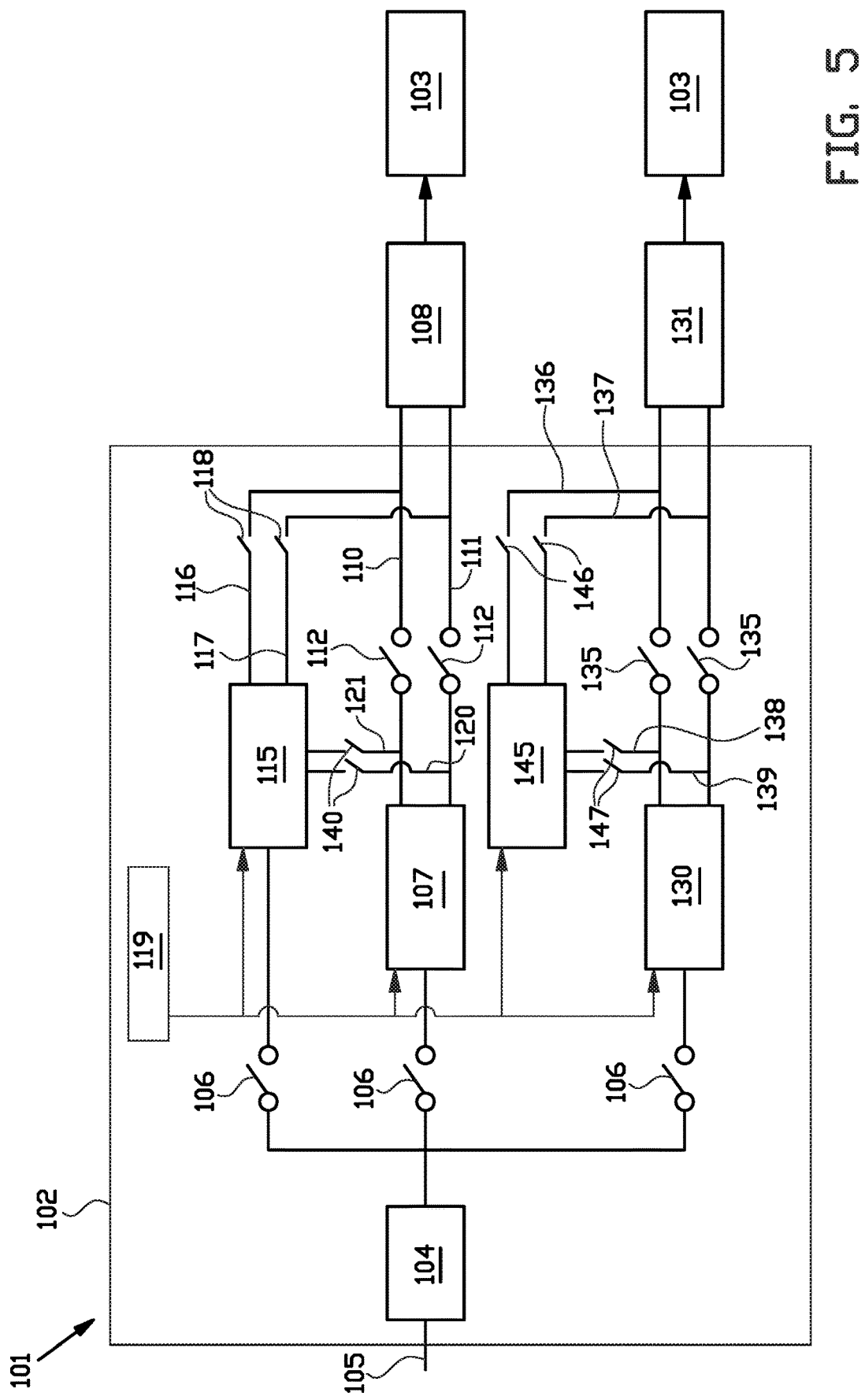
FIG. 5 shows a schematic view of an electric vehicle charging arrangement according to a further embodiment of the present disclosure.

A schematic view of an electric vehicle charging arrangement 1 according to further embodiments of the present disclosure are shown in FIGS. 4 and 5. In order to refrain from re-introducing corresponding or similar features, corresponding or similar features are referred to by the same reference numbers as used in relation to FIG. 1, increased by 100.

The EVSE 102 as shown in FIGS. 4 and 5 includes a further power module 130 in addition to the power module 107. The further power module 130 outputs DC to a further output 131 arranged downstream of the further power module 130 via a further DC bus 132 having a further DC+ conductor 133 and a further DC− conductor 134. The further output 131 is configured for connection to another electric vehicle 103 to be charged. Each of the further DC+ conductor 133 and the further DC− conductor 134 is provided with a further contactor 135 arranged between the further power module 130 and the further output 131. The further contactors 135 are configured for connecting or disconnecting the further power module 130 and the further output 131. The pre-charge module 115 is powered by AC received from the power input 105, wherein a disconnection device 106 is provided between the power input 105 and the pre-charge module 115. Furthermore, the controller 119 is also connected operatively to the power module 107 and the further power module 130.

In the embodiment shown in FIG. 4, the pre-charge module 115, in particular the output thereof, is connected to the further DC+ conductor 133 by means of a further DC+ pre-charge conductor 136, and to the further DC− conductor 134 by means of a further DC− pre-charge conductor 137 downstream of the further contactors 136. The pre-charge switching matrix 118 is configured for selectively connecting or disconnecting the pre-charge module 115 with the DC bus 109 or with the further DC bus 132.

As shown in FIG. 4, the pre-charge module 115 is also connected to the further DC bus 132 upstream of the further contactors 135 by means of a further DC− measure conductor 138 and a further DC+ measure conductor 139. The measure conductors 120, 121; 138, 139 are provided with a measure switching matrix 140 for selectively connecting or disconnecting the pre-charge module 115 with the DC bus 109 or with the further DC bus 132 upstream of the contactors 112; 135.

In the embodiment shown in FIG. 5, the EVSE 102 is provided with a further pre-charge module 145. The further pre-charge module 145, in particular the output thereof, is connected to the further DC+ conductor 133 by means of a further DC+ pre-charge conductor 136, and to the further DC− conductor 134 by means of a further DC− pre-charge conductor 137 downstream of the further contactors 136. A further pre-charge switching matrix 146 is provided, which is configured for selectively connecting or disconnecting the further pre-charge module 145 with the further DC bus 132. Furthermore, the further pre-charge module 145 is also connected to the further DC bus 132 upstream of the further contactors 135 by means of a further DC− measure conductor 138 and a further DC+ measure conductor 139, wherein a further measure switching matrix 147 is provided for selectively connecting or disconnecting the further pre-charge module 145 with the further DC bus 132 upstream of the contactors 135.

Figure 6:
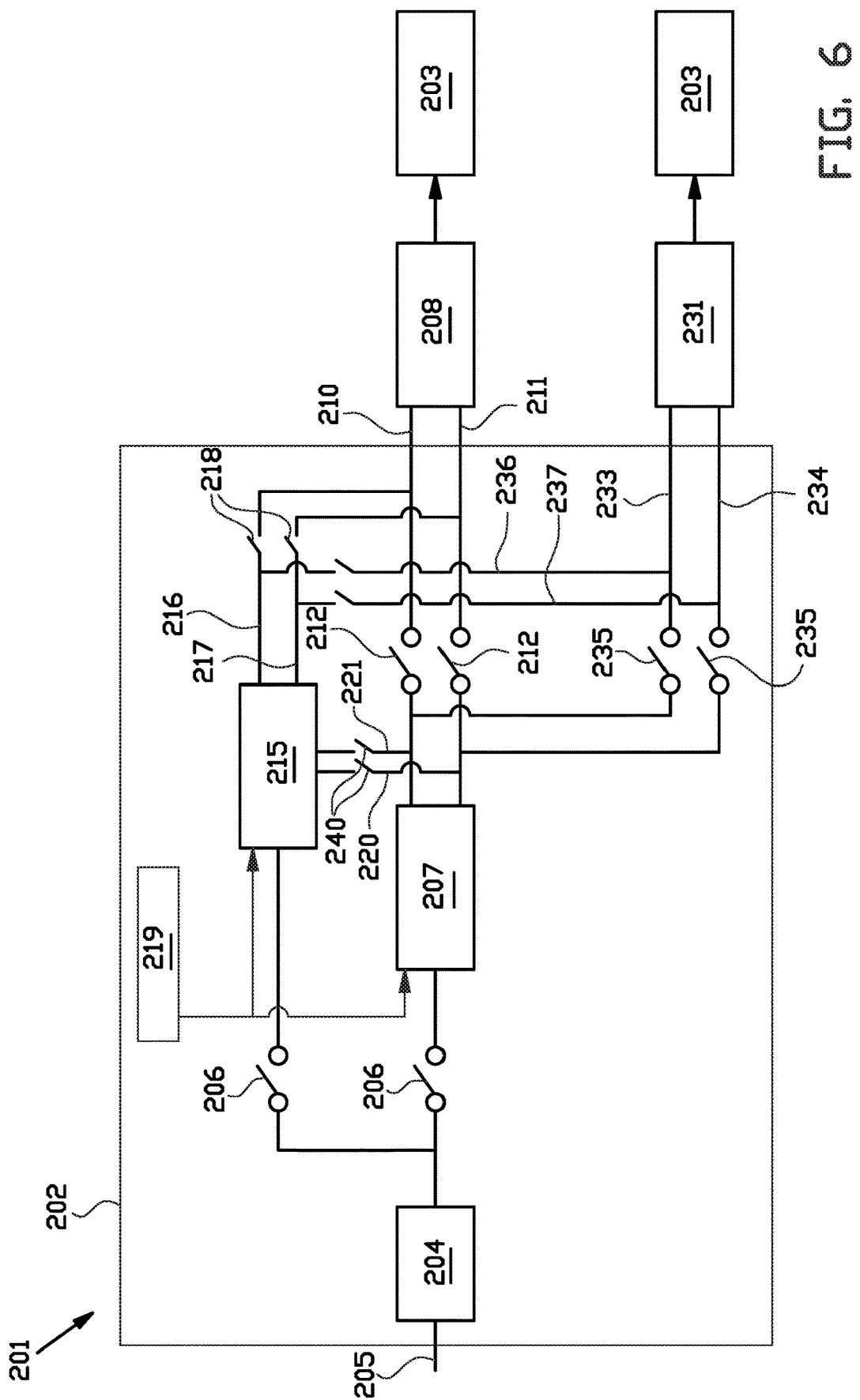
FIG. 6 shows a schematic view of an electric vehicle charging arrangement according to a further embodiment of the present disclosure.
Figure 7:
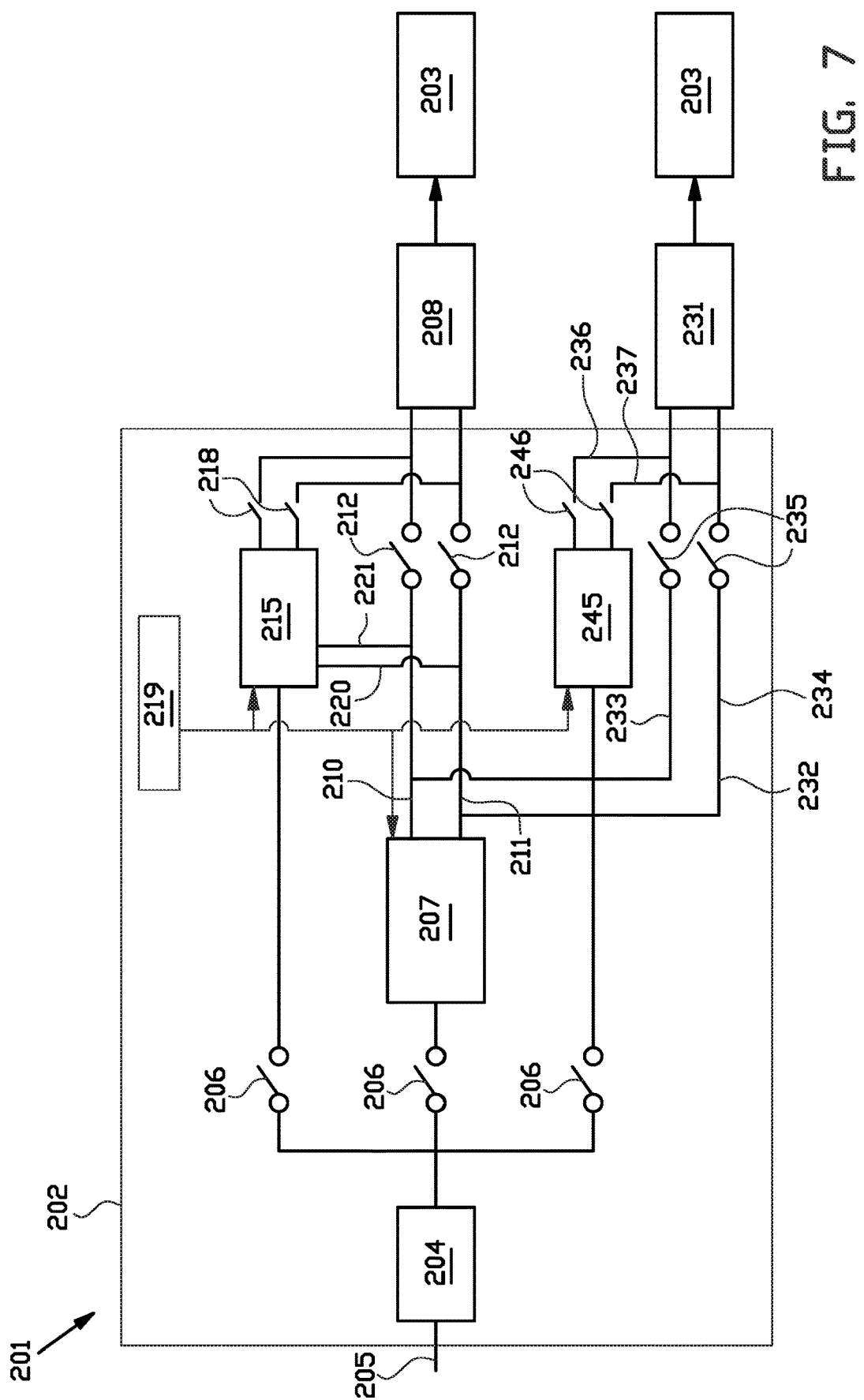
FIG. 7 shows a schematic view of an electric vehicle charging arrangement according to a further embodiment of the present disclosure.

A schematic view of an electric vehicle charging arrangement 1 according to further embodiments of the present disclosure are shown in FIGS. 6 and 7. In order to refrain from re-introducing corresponding or similar features, corresponding or similar features are referred to by the same reference numbers as used in relation to FIG. 1, increased by 200.

The EVSE 102 as shown in FIGS. 6 and 7 includes a further output 231 that is connected to the power module 207 by means of a further DC bus 232. The EVSE 202 according to these embodiments thus includes a single power module 207 and two outputs 208, 231. The further DC bus 232 includes a further DC+ conductor 233 that is connected to the DC+ conductor 210 of the DC bus 209, and a further DC− conductor 234 that is connected to the DC− conductor of the DC bus 209. The further output 231, therefore, is powered by the power module 207 and via the DC bus 209. As shown in FIGS. 6 and 7, upstream of the contactors 212, 235, the pre-charge module 215 is connected to the DC bus 209 by means of the DC+ pre-charge conductor 216 and the DC− pre-charge conductor 217.

The embodiment as shown in FIG. 6 has a single pre-charge module 215 that is connected to the further DC bus 232 by means of the further DC+ pre-charge conductor 236 and the further DC− pre-charge conductor 237. The pre-charge matrix 218 is provided for selectively connecting or disconnecting the pre-charge module 215 with the DC bus 209 and/or the further DC bus 232.

Downstream of the contactors 212, the pre-charge module 215 is connected only to the DC bus 209 by means of the measure DC− conductor 220 and the measure DC+ conductor 221. The measure DC− conductor 220 and the measure DC+conductor 221 are provided with the measure switching matrix 240 for selectively connecting or disconnecting the pre-charge module 215 to the DC bus 209 upstream of the contactors 212, and upstream of the connection of the further DC bus 232 to the DC bus 209.

In the embodiment as shown in FIG. 7, the further output 231 is provided with a further pre-charge module 245, such that each output 208, 231 is provided with its own pre-charge module 215, 245. The further pre-charge module 245 is connected to the further DC bus 232, in particular the further DC+ conductor 233 and the further DC− conductor 234 thereof, by means of the further DC+ pre-charge conductor 236 and the further DC− pre-charge conductor 237. A further pre-charge switching matrix 246 is provided between the further pre-charge module 245 and the further DC bus 232 for selectively connecting or disconnecting the further pre-charge module 245 and the further DC bus 232.

Furthermore, the pre-charge module 215 is connected permanently to the DC bus 209 downstream of the contactors 212 and upstream of the connection of the further DC bus 232 to the DC bus 209.

The embodiments of FIGS. 6 and 7 enable the EVSE 202, for example, to charge the EV 203 connected to the output 208 and, simultaneously, to pre-charge and, optionally, to perform cable check at the further output 231. If supported by the EV 203, the EVSE may charge at 0 A at the further output 231 to keep both processes running. As soon as the charging session at the output 208 is completed, the power module 207 may switch to the further output 231 to start charging the EV 203 connected to the further output 231, without starting a new charging session.

It is to be understood that the above description is included to illustrate the operation of the preferred embodiments and is not meant to limit the scope of the present disclosure. From the above discussion, many variations will be apparent to one skilled in the art that would yet be encompassed by the scope of the present disclosure.

The invention claimed is:

1. An electric vehicle charging arrangement for charging an electric vehicle, comprising an electric vehicle supply equipment (EVSE), wherein the EVSE comprises:
   a power module configured to provide electrical energy to charge the electric vehicle;
   an output configured to connect the power module to the electric vehicle for charging the electric vehicle; and
   a direct current (DC) provided between and connected to the power module and the output and configured to transport electric energy from the power module to the output,
   wherein the EVSE comprises a pre-charge module configured to pre-charge the output, and
   wherein the pre-charge module works independently from the power module, such that the pre-charge module is used for pre-charging and the power module is used for charging the electric vehicle, is separate from the power module and is electrically connected to the DC bus.

2. The electric vehicle charging arrangement according to claim 1, wherein the DC bus comprises a DC+ conductor and a DC− conductor,
   wherein the pre-charge module is connected to the DC+ conductor and the DC− conductor.

3. The electric vehicle charging arrangement according to claim 1, wherein the DC bus comprises a contactor between the power module and the output, wherein the contactor is configured to connect or disconnect the power module and the output.

4. The electric vehicle charging arrangement according to claim 3, wherein the pre-charge module is connected to the DC bus downstream of the contactor.

5. The electric vehicle charging arrangement according to claim 4, comprising a pre-charge switching matrix provided between the pre-charge module and the DC bus and configured to selectively disconnect or connect the pre-charge module and the DC bus downstream of the contactor.

6. The electric vehicle charging arrangement according to claim 3, wherein the pre-charge module is connected to the DC bus upstream of the contactor.

7. The electric vehicle charging arrangement according to claim 6, comprising a measure switching matrix provided between the pre-charge module and the DC bus and configured to selectively disconnect or connect the pre-charge module and the DC bus upstream of the contactor.

8. The electric vehicle charging arrangement according to claim 1, wherein the EVSE comprises one or more further outputs, and one or more further DC busses to connect the one or more further outputs to at least one of the DC bus and the power module, and
   wherein the pre-charge module is electrically connected to the one or more further DC busses, and wherein the EVSE comprises one or more further pre-charge modules for each of the one or more further outputs.

9. The electric vehicle charging arrangement according to claim 1, wherein the EVSE comprises one or more further power modules, one or more further outputs for connecting the one or more further power modules to one or more electric vehicle, and one or more further DC busses provided between and connected to the one or more further power modules and the one or more further outputs, and
   wherein the pre-charge module is electrically connected to the one or more further DC busses, and wherein the EVSE comprises one or more further pre-charge modules for each of the one or more further outputs.

10. The electric vehicle charging arrangement according to claim 1, wherein the EVSE comprises a controller operatively connected to the pre-charge module and configured to control the pre-charge module.

11. The electric vehicle charging arrangement according to claim 10, wherein the controller is configured to power the pre-charge module with alternating current (AC), or direct current (DC).

12. The electric vehicle charging arrangement according to claim 1, wherein the pre-charge module is integrated in a printed circuit board (PCB).

13. The electric vehicle charging arrangement according to claim 1, wherein the pre-charge module has at least one of a high output impedance and a low Y capacitance.

14. A method for charging an electric vehicle utilizing the electric vehicle charging arrangement according to claim 1, wherein the method comprises:
   connecting an electric vehicle to be charged to the output of the EVSE, without connecting a vehicle battery of the electric vehicle to the DC bus;
   pre-charging the output to a voltage corresponding to approximately a battery voltage of the vehicle battery utilizing the pre-charge module;
   when the output is pre-charged, connecting the vehicle battery to the DC bus; and
   charging the electric vehicle.

15. The method according to claim 14, wherein the EVSE comprises one or more further outputs, and one or more further DC busses for connecting the one or more further outputs to the DC bus, and wherein the pre-charge module is electrically connected to the one or more further DC busses, and wherein the EVSE comprises one or more further pre-charge modules for each of the one or more further outputs, wherein the method comprises the steps of:

connecting another electric vehicle to be charged to one of the one or more further outputs of the electric vehicle supply equipment, without connecting a vehicle battery of the respective electric vehicle to the further DC bus;

while charging the electric vehicle connected to the output, pre-charging the one of the one or more further outputs;

when the one of the one or more further outputs is pre-charged, charging at the one of the one or more further outputs at 0 amps (A), or pausing; and when the electric vehicle connected to the output is charged, starting to charge the other electric vehicle connected to the one of the one or more further outputs.

* * * * *